United States Patent [19]
Ross et al.

[11] 3,741,271
[45] June 26, 1973

[54] TIRE BEAD SEALING AND SEATING DEVICE

[75] Inventors: Joseph H. Ross, Shaker Heights; William A. Weinkamer, Mentor; Laddie J. Pesek, Garfield Heights; John F. Havel, Beechwood, all of Ohio

[73] Assignee: Gould Inc., Chicago, Ill.

[22] Filed: May 24, 1971

[21] Appl. No.: 146,226

[52] U.S. Cl. .............................................. 157/1.1
[51] Int. Cl. ......................................... B60c 25/06
[58] Field of Search .................................... 157/1.1

[56] References Cited
UNITED STATES PATENTS

| | | |
|---|---|---|
| 3,461,938 | 8/1969 | Mueller................................. 157/1.1 |
| 2,874,760 | 2/1959 | Bishop.................................. 157/1.1 |
| 2,900,015 | 8/1959 | Harrison............................... 157/1.1 |
| 2,936,827 | 5/1960 | Riggs.................................... 157/1.1 |
| 3,016,934 | 1/1962 | Smyser.................................. 157/1.1 |
| 3,528,474 | 9/1970 | May...................................... 157/1.1 |

Primary Examiner—Granville Y. Custer, Jr.
Attorney—Eber J. Hyde

[57] ABSTRACT

There is presented a sealing device for seating the beads of a tubeless tire against the rims of a wheel in order that the tire may be inflated. The device comprises a double-walled cylindrical chamber which rests on and seals against a rim of the wheel and the side wall of the tire, forming with the rim and tire a sealed compartment into which air under pressure is admitted to force the tire beads against the rims of the wheel.

9 Claims, 4 Drawing Figures

PATENTED JUN 26 1973 3,741,271

INVENTORS
JOSEPH M. ROSS
WILLIAM A. WEINKAMER
LADDIE J. PESEK
JOHN F. HAVEL

BY
ATTORNEY

TIRE BEAD SEALING AND SEATING DEVICE

BACKGROUND OF THE INVENTION

In the past, tire bead seating devices of the type shown in U. S. Pat. No. 2,835,319 have been very successful, and they still are for ordinary non-belted tires. Belted tires, however, require a much larger squeezing force to seat the tire's beads against the rims of a wheel, and for steel belted tires the force required may be so great as to exceed the ability of the squeezing device. Thus it has become necessary to provide a device which relies on a sealing action between the tire and the wheel so that air admitted to the sealed tire will cause the two tire beads to seat against the rim of the wheel and permit the tire to be inflated.

SUMMARY OF THE INVENTION

An aspect of the present invention lies in the provision of a double-walled cylindrical device having coaxial inner and outer wall portions whose upper ends are sealed together by means of a flexible sealing section which permits axial motion of the outer wall in respect to the inner wall. Sealing means are secured, respectively, to the lower ends of the inner and outer cylindrical walls for engaging, respectively, the rim of a wheel and the wall of a tire. With the device in proper position it forms a sealed container comprising the double-walled device, the tire, and the wheel. Air admitted to the container by way of the regular tire valve forces the tire beads away from each other into sealing engagement with rims of the wheel. After inflation of the tire the device is easily lifted off of the tire which is then properly mounted on the wheel.

DESCRIPTION OF THE PREFERRED EMBODIMENT

Figure 1:
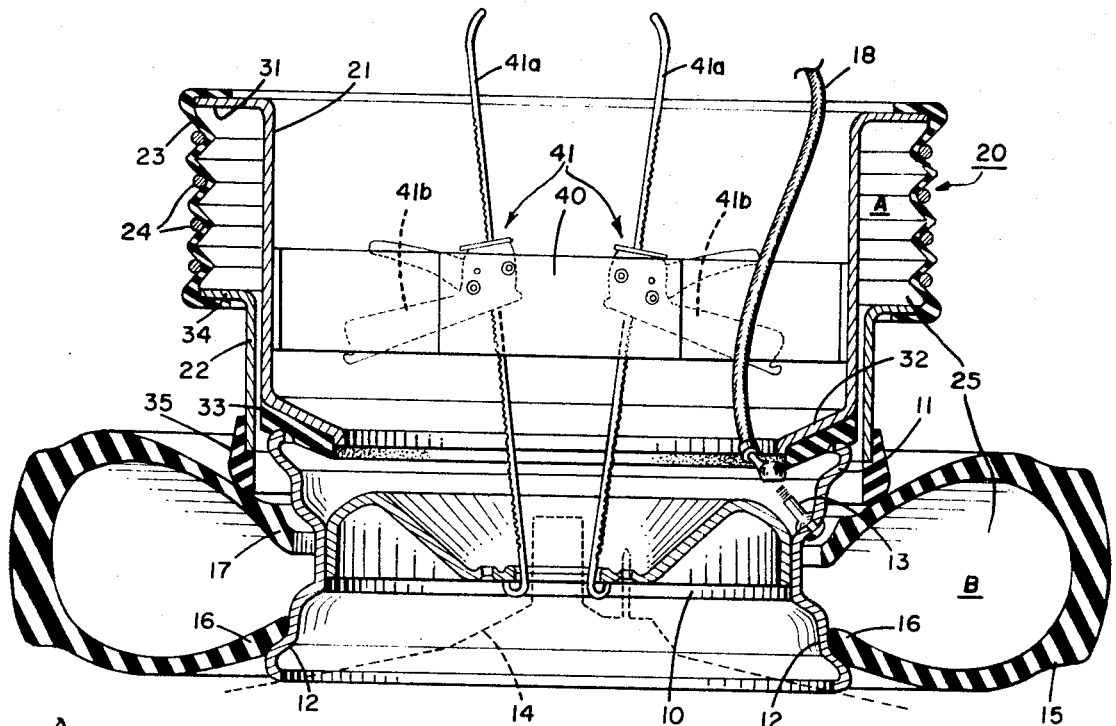
FIG. 1 of the drawings show, in cross-section, a tire loosely mounted on a wheel and the sealing device in proper position sealing between wheel rim and tire wall.

With reference to FIG. 1 there is shown in cross section a wheel 10 having an upper rim portion 11, a lower rim portion 12 and the usual inflating valve 13. The wheel is in a flat position as though it were on the floor, a bench or on a regular tire mounting apparatus shown in dotted lines 14.

A tire 15 is shown loosely mounted around the wheel 10 with its lower bead portion 16 in engagement with the lower rim 12 of the wheel 10, and with its upper bead portion 17 out of contact with the upper rim portion 11 of wheel 10. In this condidtion air admitted through valve 13 from air pressure hose 18 is ineffective to inflate the tire because of the wide gap between the upper tire bead 17 and the upper rim 11 of wheel 10.

Figure 4:
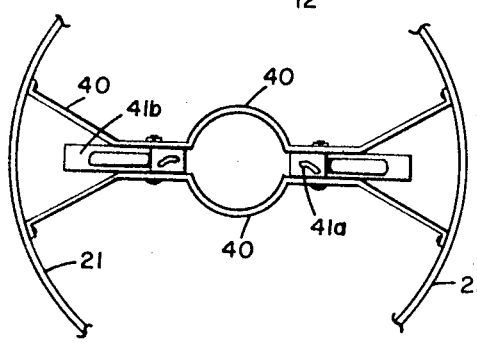
FIG. 4 is a partial top view looking down into the cylindrical member showing the cross brace on which connection means are mounted.

The seating and sealing device of this invention comprises a double-walled cylindrical device indicated generally by reference character 20, comprising a first or inner cylindrical member 21 and a co-axially mounted second or outer cylindrical member 22. Flexible sealing means such as the accordian folded flexible wall 23 connects the first and second cylindrical members 21,22 together with the first cylindrical member 21 within and axially aligned with the second cylindrical member 22. To facilitate the flexible interconnection between the two cylindrical member 21 and 22, the first or inner cylinder 21 has outwardly extending upper flange 31 and the cylindrical member 22 has an outwardly extending flange member 34. The flexible means 23 folds over the upper flange 31 of the first cylinder 21 and under the upper flange 34 of the second cylindrical member 22, and is secured in place by means of adhesive material, thus flexibly connecting the two cylinders 21, 22 together in a manner which permits the second or outer cylinder 22 to move axially in respect to the first or inner cylindrical member 21. Flange 31 and a lower inwardly extending flange 32 connected to the first, inner cylindrical member 21 rigidize the first cylindrical member 21, and the lower flange 32 has connected to its lower face a first sealing means 33 formed of sponge rubber or the like. The second or outer cylindrical member 22 has an outwardly extending upper flange 34, and has a second sealing means 35 of sponge rubber or the like secured to its lower edge. The flexible means 23 includes steel wire retaining rings 24 connected around it to prevent the flexible means from ballooning outwardly under high internal air pressure. A bracing device 40 may be connected across the diameter of the inner cylindrical member 21 for the convenience of mounting means generally designated by refernce character 41 to temporarily connect the sealing-seating device 20 to the wheel 10, as shown in FIG. 1. The temporary connecting means 41 facilitate the operation of the sealing-seating device 20. As shown in FIG. 4, one or more such temporary connecting means 41 may be mounted between two braces 40 which may be spot welded to the first cylindrical member 21, and the connecting means may be similar to the well known caulking gun device and comprise a notched shaft 41a and a trigger mechanism 41b.

With the sealing-seating device 20 firmly held in place, preferably by mounting means 41, the first seal 33 on the lower flange 32 of the first or inner cylinder 21, engages the rim 11 of the wheel 10 to form a seal therewith, and the second seal 35 engages the side wall of the tire 15 at a location near the upper bead 17, forming a seal therewith. In this position a substantially air-tight chamber 25 including portions A and B is formed by the first and second cylindrical members 21, 22 the flexible means 23, the tire 15 and the wheel 10, and the clamping device 41 insures that as air pressure within the chamber 25 increases the seal 33 will be maintained. Air admitted from pressure hose 18 through the regular tire valve 13 inflates the tire 15 causing the upper bead portion 17 to rise into engagement with the upper wheel rim 11. Upward motion of the side wall of tire 15 causes an upward motion of the outer cylindrical member 22 in respect to the inner cylindrical member 21 with the accordian pleated flexible means 23 accommodating the relative motion.

Figure 3:
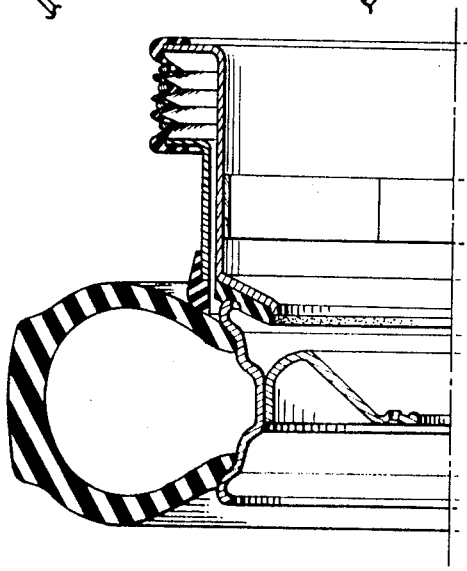
FIG. 3 is a view similar to FIG. 2, but showing the tire sufficiently inflated that both tire beads are seated on both rims of the wheel.
Figure 2:
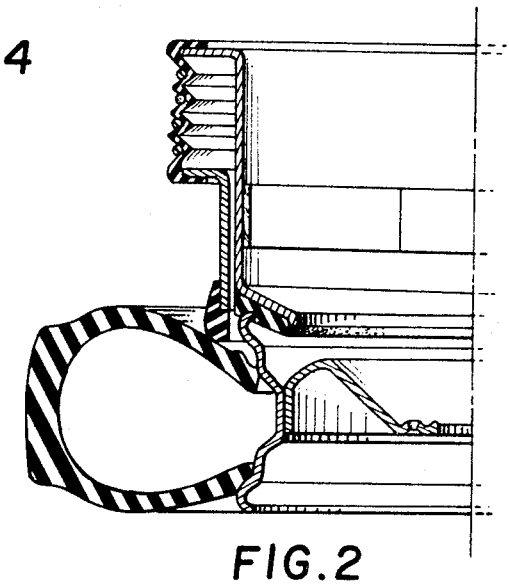
FIG. 2 is a quarter section similar to FIG. 1 but showing the tire partially inflated.

FIG. 2 shows the tire 15 in its intermediate position as air is being admitted thereto, and FIG. 3 shows the tire position after the upper tire bead 17 has been seated on the rim 11 of wheel 10. The sealing-seating device can then readily be removed after releasing the connection means 41 by rotating the shafts 41a to release their hooked ends from positive engagement with the undersde of wheel 10.

As air pressure within the enclosed chamber 25 increases the pressure in chamber portion A above flange 34 exerts a downward thrust through the second cylinder 22 to maintain the second seal 35 against the side wall of the tire 15. Air pressure within the tire portion B of the chamber exerts upward pressure through the second cylindrical member 22 and because the area of the tire side wall is considerably greater than the area of the flange 34 the second cylinder 22 will move upwardly, with the seal at 35 being maintained by the downward thrust from flange 34.

The inclined flange 32 of the first cylinder 21 should extend several inches transverse to the axial direction of the device in order to accommodate rims and tires of different diameter.

While there have been described what are at present considered to be the preferred embodiments of this invention, it will be obvious to those skilled in the art that various changes and modifications may be made therein without departing from the invention, and it is aimed, therefor, in the appended claims to cover all such changes and modifications as fall within the true spirit and scope of the invention.

What is claimed is:

1. A device for seating the beads of a tubeless tire against the rims of a wheel, comprising:
    a first relatively rigid substantially cylindrical member;
    first sealing means connected to said first cylindrical member for engaging a rim of said wheel;
    a second relatively rigid substantially cylindrical member surrounding a portion of said first rigid cylindrical member with a portion of said first cylindrical member extending axially outwardly of said second cylindrical member;
    resilient second sealing means for being compressed into sealing engagement with a side wall of said tubeles tire connected to said second cylindrical member at the end opposite from which said first cylindrical member extends outwardly;
    folded flexible means fixedly attached to the outwardly extending portion of said first cylindrical member and fixedly attached to the second cylindrical member;
    said first and second cylindrical members and said folded flexible means together with said wheel and said tire forming a substantially air tight chamber when said first and said second sealing means are in engagement with said wheel rim and said tire side wall, respectively, an inner surface of the outer wall of said chamber including a portion which produces a progressively increasing component of force on said second relatively rigid cylinder in the direction of said tire to compress said resilient second sealing means into sealing engagement with a side wall of said tire as pressure within said chamber increases, and said folded flexible means permitting axial movement of said second cylindrical member in respect to said first cylindrical member as air is admitted to said chamber to inflate said tire.

2. A tire bead seating device as set forth in claim 1 further characterized by said first cylindrical member having a radially inwardly extending lip to which said first sealing means is secured, the radial extent of said lip and said first sealing means accommodating wheels of varying diameter.

3. A tire bead seating device as set forth in caim 2, further characterized by said flexible means being secured to the end of said first cylindrical member opposite said radially inwardly extending lip, and secured to said second cylindrical member at one end thereof, said second sealing member being secured to the end of said second cylindrical member opposite to the end to which the flexible member is secured.

4. A tire bead seating device as set forth in claim 3, further characterized by connecting means secured to said first cylindrical means for clamping said tire bead seating device to said wheel with said first sealing means in sealing engagement with a rim of the wheel and with said second sealing means in sealing engagement with a side wall of said tire.

5. A tire bead seating device as set forth in claim 3, further characterized by connecting means secured to said first cylindrical means for clamping said tire bead seating device to said wheel with said first sealing means in sealing engagement with a rim of the wheel and with said second sealing means in sealing engagement with a side wall of said tire, said connecting means comprising a rigid member connected across the inner diameter of said first cylindrical member and means adjustable in length connected to said rigid member and adapted to connect to the wheel.

6. A device for seating the beads of a tubeless tire against the rims of a wheel, comprising:
    a double walled cylindrical device having relatively rigid coaxial inner and outer wall portions the upper ends of which are sealed together;
    a flexible sealing section in the outer wall of said cylindrical device to permit axial motion of the outer wall in respect to said inner wall;
    and first and second sealing means connected, respectively, to the lower ends of said inner and outer wall portions for engaging, respectively, the rim of the wheel, and a wall of the tire forming therewith a closed container when the tire bead opposite said wall of the tire is in engagement with said rim, an inner surface of the outer wall of said closed container including a portion which produces a progressively increasing component of force on the relatively rigid outer wall portion in the direction of the wall of the tire as pressure within said closed container increases.

7. A device for seating the beads of a tubeless tire against the rims of a wheel, comprising:
    a first cylindrical member having an outwardly extending upper flange member and an inwardly extending lower flange member;
    first sealing means secured to the lower face of said lower flange member for engaging a rim of said wheel;
    a second cylindrical member having an outwardly extending upper flange member of given area at its upper end;
    second sealing means connected to said second cylindrical member at its lower end for engaging a side wall of said tubeless tire;

flexible sealing means connected to the upper flanges of said first and second cylindrical members and permitting axial relative motion between said two cylindrical members;

said first and second cylindrical members and said flexible means together with said wheel and said tire forming a substantially air tight chamber when said first and second sealing means are in engagement with said wheel rim and said tire side wall, respectively, air pressure in said air tight chamber acting against the said given area of said upper flange member of said second cylindrical member to maintain said second seal against the side wall of said tire, and the air pressure in said tire acting against the area of one of the side walls of said tire; the area of the one side wall of said tire being greater than the said given area of the flange member whereby the tire side wall moves the said second cylindrical member axially against the air pressure acting on said flange of given area, thereby causing a bead of said tire to seat against a rim of said wheel.

8. A device for seating the beads of a tire against the rims of a wheel as set forth in claim 7, further characterized by means connected to said first cylinder means for detachably securing the first cylinder means to said wheel with the said first seal means in sealing engagement with a rim of said wheel.

9. A device for seating the beads of a tire against the rims of a wheel as set forth in claim 8, further characterized by means extending around the outside of said flexible means to prevent said flexible means from ballooning outwardly as air pressure builds up within said substantially air tight chamber.

* * * * *